United States Patent
Oberheu et al.

(10) Patent No.: US 12,279,622 B2
(45) Date of Patent: Apr. 22, 2025

(54) PAN OILING DEVICES, SYSTEMS AND METHODS OF USE

(71) Applicant: Vantage Specialty Chemicals, Inc., Gurnee, IL (US)

(72) Inventors: Adam Rick Oberheu, Delta, CO (US); Michael Rodger Hewitt, Aliquippa, PA (US); Nicholas Ryan Anderson, Pittsburgh, PA (US)

(73) Assignee: Vantage Specialty Chemicals, Inc., Gurnee, IL (US)

( * ) Notice: Subject to any disclaimer, the term of this patent is extended or adjusted under 35 U.S.C. 154(b) by 0 days.

(21) Appl. No.: 18/678,083

(22) Filed: May 30, 2024

(65) Prior Publication Data
US 2024/0415130 A1 Dec. 19, 2024

Related U.S. Application Data

(60) Provisional application No. 63/508,011, filed on Jun. 14, 2023.

(51) Int. Cl.
| | |
|---|---|
| *A21B 3/16* | (2006.01) |
| *B05B 12/00* | (2018.01) |
| *B05B 12/08* | (2006.01) |
| *B05B 13/02* | (2006.01) |

(52) U.S. Cl.
CPC .............. *A21B 3/16* (2013.01); *B05B 12/008* (2013.01); *B05B 12/082* (2013.01); *B05B 12/085* (2013.01); *B05B 13/0221* (2013.01)

(58) Field of Classification Search
None
See application file for complete search history.

(56) References Cited

U.S. PATENT DOCUMENTS

| | | | |
|---|---|---|---|
| 3,830,608 | A | 8/1974 | Sebastian |
| 5,366,553 | A | 11/1994 | Lair et al. |
| 5,531,832 | A | 7/1996 | McCalip et al. |
| 2008/0148966 | A1 | 6/2008 | Smith et al. |
| 2019/0037856 | A1 | 2/2019 | Mackey |
| 2022/0018700 | A1 | 1/2022 | Griggs et al. |

OTHER PUBLICATIONS

International Search Report and Written Opinion issued in International Application No. PCT/US2024/031565, mailed on Aug. 19, 2024, 11 pages.
"Model EPO 2001 Bread Pan Oiler", Mallet, Feb. 21, 2007, product specification page, Carnegie, PA, retrieved from http://www.malletoil.com/html/model_epo_2001_bread_pan_oiler.html.
"Vantage Food and BAKERpedia | Live from IBIE with the Mallet 3001", Vantage, YouTube Video posted Apr. 14, 2023, retrieved from https://www.youtube.com/watch?v=33CaSmpenqo&list=PLkd7BVGmUkCwvC4DndXAN-VITnhroXw7l&index=10.

*Primary Examiner* — Charles Capozzi
(74) *Attorney, Agent, or Firm* — Dorsey & Whitney LLP

(57) ABSTRACT

A baking pan oiling device includes a housing, a conveyor mechanism, an oil supply, a nozzle fluidly coupled to the oil supply configured to intermittently spray the oil onto baking pans. A first sensor configured to sense a presence of movement of oil through the oil supply and to sense an absence of movement of oil through the oil supply during the pan oiling operation. A control unit communicatively coupled to the first sensor configured to receive sensor data corresponding to the presence of the movement of oil or the absence of the movement of oil during the pan oiling operation. Upon receiving the sensor data corresponding to the absence of the movement of oil during the pan operation, the control unit ceases the pan oiling operation.

19 Claims, 7 Drawing Sheets

PAN OILING DEVICES, SYSTEMS AND METHODS OF USE

CROSS-REFERENCE TO RELATED APPLICATIONS

This application claims priority to U.S. Provisional Patent Application No. 63/508,011, filed Jun. 14, 2023, entitled "PAN OILING DEVICES, SYSTEMS AND METHODS OF USE," which is incorporated by reference herein, in the entirety and for all purposes.

TECHNICAL FIELD

The present disclosure relates generally to pan oiling devices for use in the industrial production of comestibles.

BACKGROUND

In the industrial production of comestibles, production runs typically subject mass quantities of the comestible precursors to the same treatments and conditions to provide consistency in the finished products. Production runs typically involve the use of multiple machines and devices such as dough forming machines, pan oiling devices, dough depositing machines, industrial ovens, all of which are required to be operational in order to produce quality finished products.

SUMMARY

Implementations of the present disclosure provide pan oiling systems and methods of oiling pans using such systems in connection with production of comestibles, such as baked goods.

According to certain implementations, a baking pan oiling device includes a housing with a conveyor mechanism and an oil supply. The conveyor mechanism may convey a plurality of baking pans through an interior of the housing during a pan oiling operation of the plurality of baking pans. A nozzle fluidly may be coupled to the oil supply and include a nozzle opening directed towards the conveyor mechanism. The oil supply may be configured to deliver oil to the nozzle intermittently during the pan oiling operation such that the nozzle intermittently sprays the oil onto the baking pans. A first sensor may be configured to generate signals corresponding to a sensed presence of movement of oil through the oil supply and to generate signals corresponding to a sensed absence of movement of oil through the oil supply during the pan oiling operation. A control unit may be communicatively coupled to the first sensor and be configured to receive the sensor signals corresponding to the sensed presence of the movement of the oil or the sensed absence of the movement of oil during the pan oiling operation. Upon receiving the sensor signals corresponding to the sensed absence of the movement of oil during the pan operation, the control unit ceases the pan oiling operation.

In implementations and alternatives, the control unit may be communicatively coupled over a network and be configured to transmit a message to at least one remote user device upon the control unit ceasing the pan oiling operation. In addition or alternatively, the baking pan oiling device may include an indicator, and the control unit may cause the indicator to be actuated upon ceasing the pan oiling operation, and/or the oil supply may include a pump, and/or the pump may be coupled to a reservoir of the oil supply and is operable to transmit oil through an oil line to the nozzle. In some cases, the first sensor may be arranged between the pump and the nozzle. For instance, the first sensor may be coupled to the oil line.

In implementations and alternatives, the baking pan oiling device further includes a second sensor configured to sense when one of the plurality of baking pans is received at the baking pan oiling device, and the oil supply may deliver the oil to the nozzle at a pre-determined time after the second sensor senses when the one of the plurality of baking pans is received. In addition or alternatively, the nozzle may be height adjustable, and or the baking pan oiling device may include guide rails extending parallel along a direction of transport of the conveyor, and may be configured to guide the plurality of baking pans through the housing.

In implementations and alternatives, the first sensor is configured to sense a change in pressure in the oil supply, where the change in pressure in the oil supply corresponds to an intermittent spray operation of the nozzle and an absence of the change in pressure in the oil supply corresponds to a missed spray operation of the nozzle, and where the absence of the movement of oil during the pan operation is determined by control unit upon receiving a predetermined number of absences of the change in pressure in the oil supply.

In implementations and alternatives, the first sensor is a spray sensor and is configured to sense a presence of the spray at the nozzle and an absence of the spray at the nozzle, and where the absence of the movement of oil during the pan operation is determined by control unit upon receiving a predetermined number of absences of the spray at the nozzle.

According to other implementations, a baking pan oiling device includes a first sensor configured to generate signals corresponding to a sensed presence of movement of oil through the oil supply and to generate signals corresponding to a sensed absence of movement of oil through the oil supply during the pan oiling operation; a second sensor configured to sense a receipt of one of a plurality of baking pans at the baking pan oiling device; a nozzle fluidly coupled to the oil supply, the nozzle including a nozzle opening for spraying oil onto each of the plurality of baking pans, where the oil supply may be configured to deliver oil to the nozzle intermittently during the pan oiling operation such that the nozzle intermittently sprays the oil onto each of the plurality of baking pans; a control unit communicatively coupled to the first sensor and to the second sensor, where the control unit is configured to receive the sensor signals from the first sensor corresponding to the sensed presence of the movement of the oil or the sensed absence of the movement of oil during the pan oiling operation and from the second sensor corresponding to the receipt of the one of the plurality of baking pans. The control unit may cause the oil supply to deliver the oil to the nozzle at a pre-determined time after the second sensor senses when the one of the plurality of baking pans is received during the pan oiling operation. Upon receiving the sensor data from the first sensor within a timeframe including the pre-determined time, the control unit may determine the presence of the movement of the oil or the absence of the movement of oil during the pan oiling operation, and upon determining the absence of the movement of oil during the pan oiling operation, the control unit causes the nozzle to cease spraying.

In implementations and alternatives, upon determining the absence of the movement of oil during the pan oiling operation, the control unit may cause the pan oiling operation to stop. In addition or alternatively, the control unit may be communicatively coupled over a network, and upon determining the absence of the movement of oil during the pan oiling operation the control unit may transmit a message to at least one remote user device, and/or the baking pan oiling device may include an indicator, and upon determining the absence of the movement of oil during the pan oiling operation, the control unit may cause the indicator to be actuated, and/or the oil supply may include a pump coupled to a reservoir of the oil supply and may be operable to transmit oil through an oil line to the nozzle. In such cases, the first sensor may be coupled to the oil line, and/or the first sensor may be coupled to the nozzle.

According to other implementations, a method for implementing a pan oiling operation using a baking pan oiling device may include receiving signals generated by a first sensor during the pan oiling operation, the signals of the first sensor corresponding to a sensed presence of movement of oil through an oil supply and to a sensed absence of movement of oil through the oil supply; receiving signals generated by a second sensor during the pan oiling operation, the signals of the second sensor corresponding to a sensed receipt of each of a plurality of baking pans at the baking pan oiling device; causing a nozzle fluidly coupled to the oil supply to deliver oil to the nozzle intermittently during the pan oiling operation at a pre-determined time after the second sensor senses when each of the plurality of baking pans is received during the pan oiling operation such that the nozzle sprays the oil onto each of the plurality of baking pans; evaluating the signals generated by the first sensor and the second sensor by a control unit, where upon receiving the sensor data from the first sensor within a timeframe including the pre-determined time, the control unit determines the presence of the movement of the oil or the absence of the movement of oil during the pan oiling operation, and upon determining the absence of the movement of oil during the pan oiling operation, the control unit causes the nozzle to cease spraying.

DETAILED DESCRIPTION

Figure 1A:
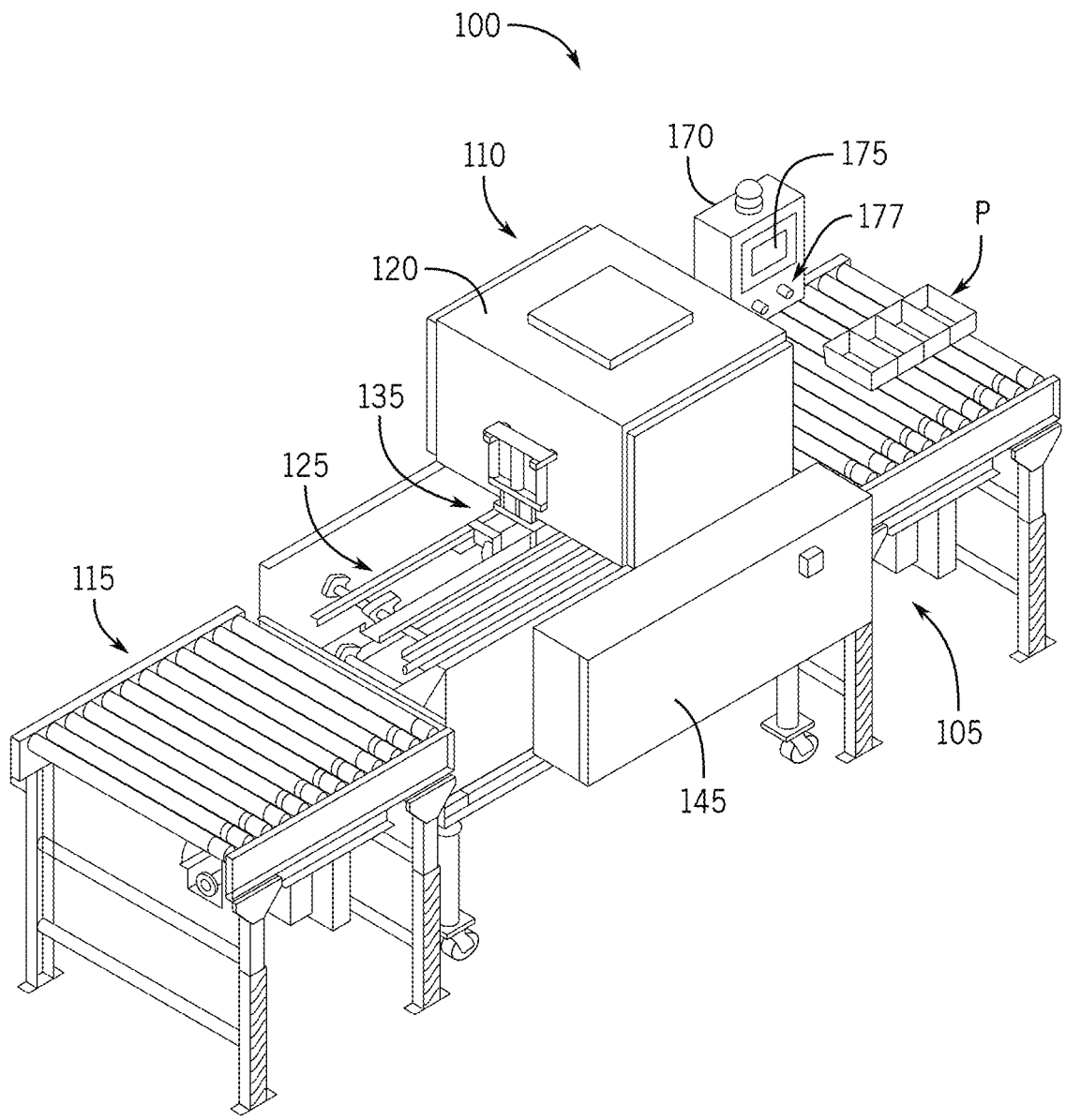
FIG. 1A is an isometric, left, front side view of a pan oiling system, according to the present disclosure.

Implementations provide pan oiling systems and methods of use for depositing oil onto pans. The pan oiling systems may deposit oil onto baking pans used in the industrial production of comestibles. These pans are commonly glazed due to the ability of the glaze to release a baked or cooked comestible without leaving a residue on the pan, making pan cleaning and reuse more efficient. Over time this glaze wears-off, reducing and eventually eliminating the ability for the pan to release the baked good, and resulting in reduced production efficiencies. Deposition of edible oil onto a glazed pan prior to baking not only provides additional releasing properties, but also serves to preserve the glaze on the pan for a longer period of time. During production of comestibles, the pans are therefore commonly oiled prior to subjecting the pan to elevated temperatures, such as in an oven or other cooking environment. By oiling these pans prior to each production run, e.g., prior to each baking operation, the pans may be re-used for more cycles compared to use of the pans without oiling. In industrial operations, all pans used in a production run are typically subjected to the same treatments and conditions to provide consistency in the finished products produced during the run. The number of pans processed per hour or per day can vary greatly depending on the bakery, e.g., a light duty bakery may run a single shift 5 days a week while a hard running bakery may run 3 shifts 7 days a week and only stop the line for 1 shift during that period to perform maintenance. Line speeds also vary from bakery to bakery, so it is hard to quantify how many shots are made per hour. Consequently, the pans are subjected to intensive operating conditions. When equipment used in the production run does not operate as expected, this can reduce efficiencies or may even destroy the glaze on pans. Although the pans can be re-glazed, the re-glazing process takes days or weeks and can slow or even stop production. As a result, there is a need to provide pan oiling systems that can reliably deposit oil onto the pans and provide notification to users when such systems are not properly operating.

Edible oils according to the present disclosure may generally be fat compositions delivered as a liquid, such as a liquid oil delivered at ambient and elevated temperatures based on the melting point of the oil, or liquid grease delivered at elevated temperatures, e.g., above the melting point of the grease. Examples of edible oils include but are not limited to vegetable oils and fats. Example oils that may be used in in the baking pan oiling system of the present disclosure may include blended oil formulas that may include but are not limited to: vegetable oils (soy, sunflower, canola), vegetable lecithins (soy, sunflower, canola), optionally shelf-life extenders, pH adjusters, and preservatives or pure food oils such as vegetable, canola, sunflower, soy, and so on.

The following description of certain embodiments is merely exemplary in nature and is in no way intended to limit the scope of the disclosure or its applications or uses.

Turning to the figures, FIG. 1A illustrates a baking pan oiling system 100 according to the present disclosure. The system 100 generally includes an intake or infeed conveyor 105, a baking pan oiling device 110, a discharge conveyor 115 and a plurality of baking pans P.

The system 100 may deliver the baking pans P to the baking pan oiling device 110 via the infeed conveyor 105, and the baking pan oiling device 110 may deposit oil onto the pans P deliver the oiled pans P via the discharge conveyor 115 to downstream devices used in baking, cooking or other comestible production operations. The plurality of baking pans P may be glazed, unglazed, partially glazed, and prior to being received in the baking pan oiling device 110, the pans may be unoiled. In some implementations, the pans P may be clean and free of dough or other unbaked comestibles, while, in other cases, the pans P may be loaded, for instance, with unbaked comestibles such as dough and require oil to be deposited thereon. The pans P may be configured to receive oil as well as a target unbaked comestible, and may serve as a comestible-receiving cavity or mold during the baking, cooking or other comestible production operations. For instance, the pans P may be configured as bread pans, cake pans, and/or roll pans with varying dimensions. The baking pan oiling device 110 may deliver about 100 to about 350, about 100 to about 200, about 200 to about 300, or about 200 to about 350 shots of oil per minute.

The infeed and discharge conveyors 105, 115 of the baking pan oiling system 100 may be configured to transport the baking pans P to and from the baking pan oiling device 110, respectively. In operation, the conveyors 105, 115 may operate continuously, intermittently, at pre-defined or variable rates or speeds, and may be controlled by the control unit 145 or other components of the system 100. The conveyors may be configured as belt, table top chain, or roller conveyors, for example.

With reference to FIGS. 1A-1C and 2A, the baking pan oiling device 110 may include a housing 120, a conveyor 125, an oil supply 130, a nozzle 135, an oil delivery sensor 140, a control unit 145, a communication network 150, remote user devices 160, a user interface 170, an indicator 180, a pan sensor 185, and a guide mechanism 190.

The housing 120 of the baking pan oiling device 110 may be configured to house mechanical and electrical components of the baking pan oiling device 110, and may include sealed walls or encasements to protect such components for instance during cleaning and sanitizing operations. In some examples, the housing 120 may cover the conveyor 125, at least a portion of the oil supply 130, at least a portion of the guide mechanism 190, as well as other components that may need protection. The housing 120 may include walls and supports constructed of durable material such as stainless steel and may include seals such as gaskets.

The conveyor 125 of the baking pan oiling device 110 may be configured for transporting baking pans P through an interior of the housing 120 during a pan oiling operation of such pans P. In operation, the conveyor 125 may operate continuously, intermittently, at pre-defined or variable rates or speeds, for instance based on production run requirements. In some cases, the speed of the conveyor 125 may remain constant. The conveyor 125 may be controlled by the control unit 145 or other components of the system 100. The conveyor 125 may be configured as belt, table top chain, or roller conveyor, for example. In some implementations, the system 100 may be configured so that the conveyors 105, 115 and 125 coordinate transport the baking pans P during the pan oiling operation.

The oil supply 130 may include an oil reservoir of the baking pan oiling device 110 or may be fluidly coupled to a separate oil reservoir, such as an oil-filled barrel. The oil supply 130 may be fluidly coupled to and configured to deliver oil to the nozzle 135 during the pan oiling operation intermittently and/or at pre-defined time intervals. An intermittent spray is one that lasts for a predefined period of time and then stops. Intermittent sprays differ from continuous sprays in prior approaches, which can waste oil, cause build-up of the spray, and degradation of components of the baking pan oiling device 110. The time period during which the nozzle 135 delivers the intermittent spray may vary for instance depending on the size of the pan, the age of the pan, or combinations. The time period during which the nozzle 135 has stopped spraying may be based on the time needed for a pan P to be transported by the conveyor 125 to the nozzle 135.

The nozzle 135 may be arranged at an exterior of or within an interior of the housing 120. The nozzle 135 may include a nozzle opening directed towards the conveyor 125 for spraying the oil onto the baking pans P. The nozzle 135 may spray the oil onto the baking pans P intermittently and/or at pre-defined time intervals, for instance based on the operation of the oil supply 130. In this example, when a pump 131 of the oil supply 130 fires, this may generate an increase in fluid pressure that causes the nozzle 135 to emit a spray or shot of oil. For instance, a poppet valve in the nozzle 135 may be released to emit the spray of oil. The nozzle 135 may be configured to emit any of various spray configurations, such as spray cones, fans, and/or sprays having rectangular, square, and round patterns. In some implementations the nozzle 135 may be configured to deliver pressurized oil from the oil supply 130 in the absence of pressurized air, while in other implementations the nozzle 135 may be configured to deliver a combination of pressurized air and oil from the oil supply 130.

The amount of oil delivered from the nozzle 135 may be determined based on an amount of time the nozzle 135 sprays. For instance, the nozzle 135 may deliver spray for about 10 ms to about 750 ms, about or at least about 10 ms, about 5 to about 250 ms, about 5 to about 500 ms, about 5 to about 100 ms, about 100 to about 750 ms, about 100 to about 200 ms, and so on. In some implementations, the spray shot time may be a function of the time of operation of a stroke of the pump 131 disclosed herein. The pump stroke may be adjusted by the pan oiling device 110 based on user selections entered into the system 100, e.g., via the control unit 145. In some implementations, a pan profile may be modified by the user to thereby adjust an amount of oil delivered to a pan, for instance, based on one of various applications of use for a particular pan type. In addition or alternatively, the amount of oil delivered from the nozzle 135 may be based on a size of an orifice of the nozzle 135. In some implementations, the size of the nozzle 135 may be exchanged from one pan oiling operation to another. Shot time may be consistent during a production run to provide a consistent amount of oil to each pan.

The oil delivery sensor 140 may be configured to sense movement of oil through the oil supply 130 and/or the nozzle 135 during the pan oiling operation. For instance, the sensor 140 may sense the flow of oil and the absence of the flow of oil. In addition or alternatively, the sensor 140 may sense when the nozzle 135 sprays oil therefrom, and may sense when the nozzle 135 undergoes a spraying operation but without spraying the oil therefrom. The sensor 140 may accordingly generate signals corresponding to a sensed presence of movement of oil through the oil supply or nozzle 135 as well as signals corresponding to a sensed absence of movement of oil through the oil supply or nozzle 135 during the pan oiling operation. The oil delivery sensor 140 may for instance be coupled to the oil supply 130 or to the nozzle 135 and may be configured as a flow sensor and/or a spray sensor. Various type of sensors may be used to detect the presence or absence of fluid flow or spray and may include but are not limited to: ultrasonic sensors, pressure sensors, photoelectric sensors, proximity sensors, acoustic sensors, moisture sensors, mechanical sensors, and so on. Ultrasonic sensors may for instance rely on transit time of ultrasonic signals transmitted by and received from the sensor, which may be used to detect motion in the oil supply 130 or through the nozzle 135. The transit times differ when the oil is moving compared to when it is not moving, and thus differing signals may be transmitted by the sensor 140 to the control unit 145 for determination of whether or not oil is moving through the line or being discharged by the nozzle. Pressure sensors may detect a pressure pulse in the oil line 133 or the nozzle 135 for instance each time the pump 131 operates to move oil through the oil supply 130 and/or emit spray through the nozzle 135. Photoelectric sensors may detect changes or disruptions in light to detect oil movement or spray. Proximity sensors may detect changes in electromagnetic fields. Acoustic sensors may detect changes in acoustic waves. Moisture sensors may sense a change in moisture. Mechanical sensors may include mechanical components inserted into the oil line 133 and/or proximate an inlet of the nozzle 135 and may be used to detect oil flow or spray based on movement of the mechanical component. The use of an oil delivery sensor 140 is in contrast sensing the stroke of a pump because even when a pump fires, there is no way to know if oil actually moves through the oil supply. By sensing the presence or absence of oil delivery using an oil delivery sensor 140, the baking pan oiling device 110 may be more reliably used operations that rely on consistent pan oiling.

The sensor 140 may be communicatively coupled to the control unit 145 to enable the control unit 145 to determine whether or not oil is moving through the oil supply 130 and/or whether the nozzle 135 is emitting a spray.

The control unit 145 may generally control the baking pan oiling device 110 and may control or cooperate with other components of the system 100. For instance, the control unit 145 may control a power supply of the pan oiling device 110 and the operation of the various components of the device 110 such as the conveyor 125, a guide mechanism 190, motors, circuit breakers, relays, and so on. The control unit 145 may additionally be communicatively coupled to other components of the system 100 and may use information from such components in connection with controlling the baking pan oiling device 110. The control unit 145 may include one or more microprocessors configured with computer-implemented instructions for receiving communications from the oiling device 110 components, such as signals from the sensors 140, 185, level sensors, the network 150, user interface 170, and for generating control signals based thereon.

During the pan oiling operation, the control unit 145 may receive and monitor the signals of the sensor 140 corresponding to the sensed presence of or absence of movement of oil through the oil supply 130 and/or the nozzle 135. The signals may be monitored continuously, during certain timeframes, combinations, and so on. Due to the difference in signals generated by the sensor 140, the control unit 145 may determine each type of sensor signal, e.g., whether oil is moving being sprayed, or whether oil is not moving or being sprayed. After the control unit 145 determines oil is not moving or being sprayed, the control unit 145 may determine that baking pan oiling device 110 requires attention. For instance, once control unit 145 determines that 1 to about 5 sprays or shots of oil were missed during the pan oiling operation, the control unit 145 may take action. The missed sprays or shots may be sequential or within a pre-defined period of time, e.g., within about 10 seconds to about 5 minutes. Other missed number of spray shots resulting in the control unit 145 taking action are within the scope of the present disclosure, such as 1, 2, 3, 4, 5, 6, 7, 8, 9, 10, 11, 12, 15, 20, 25, 30, 35 or 40 missed spray shots.

Action taken by the control unit 145 may include generating and transmitting an error message in response to determining the baking pan oiling device 110 is not properly spraying oil from the nozzle 135. For instance, the control unit 145 may cease operations of the baking pan oiling device 110, may cause a message to be displayed on the user interface 170, may cause the actuator 180 to be actuated, and/or may cause a message to be sent to be sent to a remote location such as remote user devices 160, e.g., by transmitting an email over the network 150 to a predetermined distribution list of users, such as operations personnel.

In some implementations, the control unit 145 may also be used to increase or decrease an amount of oil delivered to a given pan P depending on needs of baking operation. In addition, the control unit 145 may be programmed to deliver a baseline amount of oil for new pans, e.g., a pan with an original glaze or with a new glaze, to provide the desired level of release of the finished comestible, and may automatically increase an amount of oil delivered above the baseline after the pans have been reused multiple times, which may provide the same level of release of the finished comestible as provided by the new glaze. The control unit 145 may also be used to implement different spray profiles for the same type of pan, for instance, when the same pan is used for multiple types of products, dough mixtures, etc.

The control unit 145 may be communicatively coupled and implemented over a network 150 of the baking pan oiling system 100 and may thereby transmit communications to one or more of the remote user devices 160 as provided herein. For instance, the control unit 145 may be communicatively coupled to the network 150 via a wired (e.g., network cables) or wireless connection (e.g., Wi-Fi).

The network 150 of the system 100 may include the internet, a local area network (LAN) or other near range communication equivalents, e.g., Wi-Fi, Bluetooth or LoRa, RFID, NFC, ANT, Zigbee, or WLAN, or via long range communication equivalents such as a wide area network (WAN).

The remote user devices 160 of the system 100 may be configured to receive electronic communications such as status/error messages from the pan oiling device 110 via the network 150. The remote user devices 160 may include microprocessors configured with computer-implemented instructions for receiving such communications from the oiling device 110 and may include PCs, laptops, handheld devices such as smartphones, tablets and so on.

The user interface 170 of the pan oiling device 110 may be configured as human machine interface (HMI), which may include a touch screen 175 and other user controls 177 and may be communicatively coupled to the control unit 145 to enable a user to operate the baking pan oiling device 110 and enter parameters such as a type of baking pan P (e.g., size, type of comestible to be received), type of dough to be deposited, age of baking pan, type of oil to be deposited, operating parameters, and so on. The user interface 170 may include one or more microprocessors configured with computer-implemented instructions for receiving HMI inputs and communicating with the control unit 145 as well as other components of the system 100. In some implementations, the user interface 170 may be communicatively coupled over the network 150 and may be configured similarly to the control unit 145 to deliver messages to the remote user devices 160.

The indicator 180 of the of the system 100 may be configured to be actuated when the control unit 145 determines the pan oiling operation is experiencing an error such as a nozzle malfunction, when a level of oil is low, or when the pan oiling system 100 is otherwise not properly operating. The indicator 180 may be configured to illuminate, emit a sound, haptic feedback, and so on. In some implementations, a signal emitted by the indicator 180 may differ based on the type of problem determined by the control unit 145. For instance, the indicator 180 may include a light that flashes at a certain rate when the nozzle 135 is not properly operating, and may flash at a different rate or a different color when the oil level is low in the reservoir 132. Although the indicator 180 is shown as being disposed on the user interface 170 of the pan oiling device 110, the indicator 180 may be arranged on other portions of the pan oiling device 110 such as the housing 120.

Figure 1B:
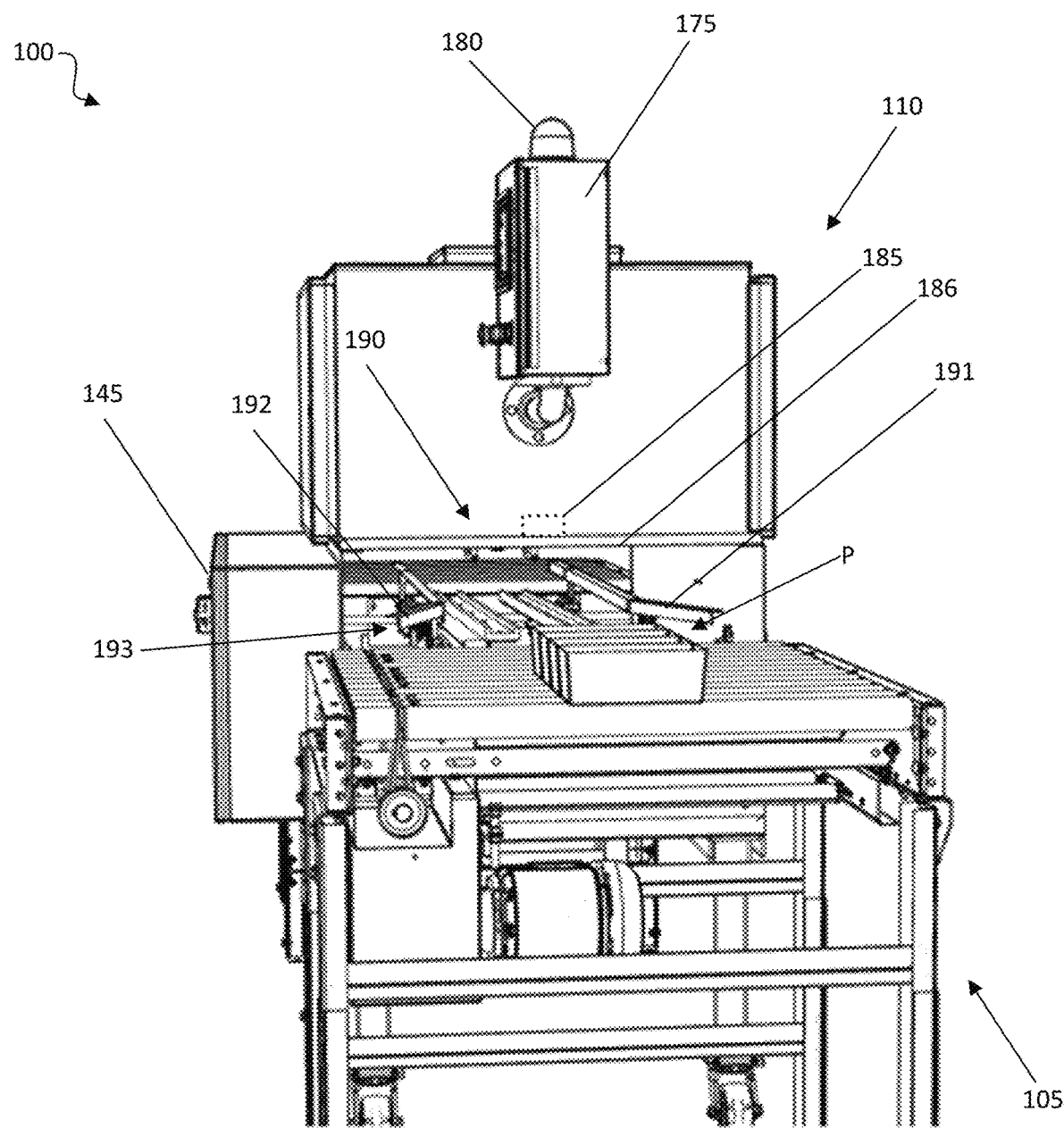
FIG. 1B is a partial isometric, right, front side view of the pan oiling system of FIG. 1A.

Turning to FIG. 1B, the pan sensor 185 of the baking pan oiling device 110 may be coupled to and/or arranged in the housing 120, such as proximate an opening 186 of the housing 120 where the baking pans P are received from the infeed conveyor 105. The pan sensor 185 may be configured as a photoelectric sensor, such as a photo eye with a transmitter (sender) and a receiver, a proximity sensor, or combinations thereof, and may be communicatively coupled to the control unit 145. The pan sensor 185 may sense when a baking pan P is received at the baking pan oiling device 110, e.g., when a leading edge of the pan reaches the opening 186 of the housing 120. The control unit 145 may be communicatively coupled to the pans sensor 185 and use the information from the pan sensor 185 to cause the oil supply 130 or nozzle 135 to be intermittently activated and deposit oil onto the sensed pan P. For instance, the control unit 145 may cause the oil to be deposited after a pre-defined amount of time from the pan P being sensed, which may correspond to the amount of time needed for the conveyor 125 to transport the sensed pan P to be centered under the nozzle 135 to thereby ensure the pan P receives the coating of oil and that the oil is not sprayed on the conveyor 125. In some implementations, where a baking pan includes a plurality of cavities or molds for use in baking multiple items, after sensing the baking pan by the pan sensor 185, the control unit 145 may be programmed to cause the oil to be deposited intermittently into each of the cavities or molds, with each intermittent spray lasting for a pre-defined amount of time such that the same amount of oil is delivered into each cavity or mold. In some implementations, the control unit 145 may use signals from the pan sensor 185 in combination with signals from the oil delivery sensor 140 to determine that a spray or shot of oil was missed. For instance, based on receiving a signal from the pan sensor 185 corresponding to the receipt of the pan P at the housing 120 or device 110 generally, the control unit 145 may determine a timeframe at which the nozzle 135 should engage in a spraying operation, e.g., a timeframe during which the pump should activate and emit a spray or shot of oil. The control unit 145 may evaluate the signals from the oil delivery sensor 140 during this timeframe to determine whether the spray or shot of oil occurred or was missed. For instance, the control unit 145 may cause the oil supply 130, e.g., the pump 131, to deliver the oil to the nozzle 135 at a pre-determined time after the pan sensor 185 senses when the one of the pans P is received during the pan oiling operation, and upon receiving the sensor data from the oil delivery sensor 140 within a timeframe including the pre-determined time at which the oil supply 130 is to deliver the oil, the control unit 145 determines the presence or absence of the movement of the oil therethrough.

The guide mechanism 190 of the baking pan oiling device 110 may be configured to guide baking pans P through the housing 120 and may include guide rails 191, 192 extending parallel along the direction of transport of the conveyor 125. The guide rails 191, 192 may facilitate transitioning the pans P from the infeed conveyor 105 to the conveyor 125 of the baking pan oiling device 110 by including a widened region 193 to facilitate receipt of and centering of the pans P as they are transported into the baking pan oiling device 110. The control unit 145 may be communicatively coupled to the guide mechanism 190 and may cause the guide mechanism 190 to be adjusted based on parameters received at the user interface 170. Alternatively, the control unit 145 may be coupled to a sensor configured to detect dimensions of the pans P and automatically adjust the guide mechanism 190 based thereon. Correctly positioning the pans P may also facilitate accurate operation of the pan sensor 185. The guide mechanism 190 may be width-adjustable and may enable the baking pan oiling device 110 to receive and deposit oil into baking pans P having a myriad of shapes and sizes. The guide rails 191, 192 may extend along a length of the baking pan oiling device 110 towards the discharge conveyor 115 for guiding the oiled pans P out of and off the baking pan oiling device 110.

Figure 1C:
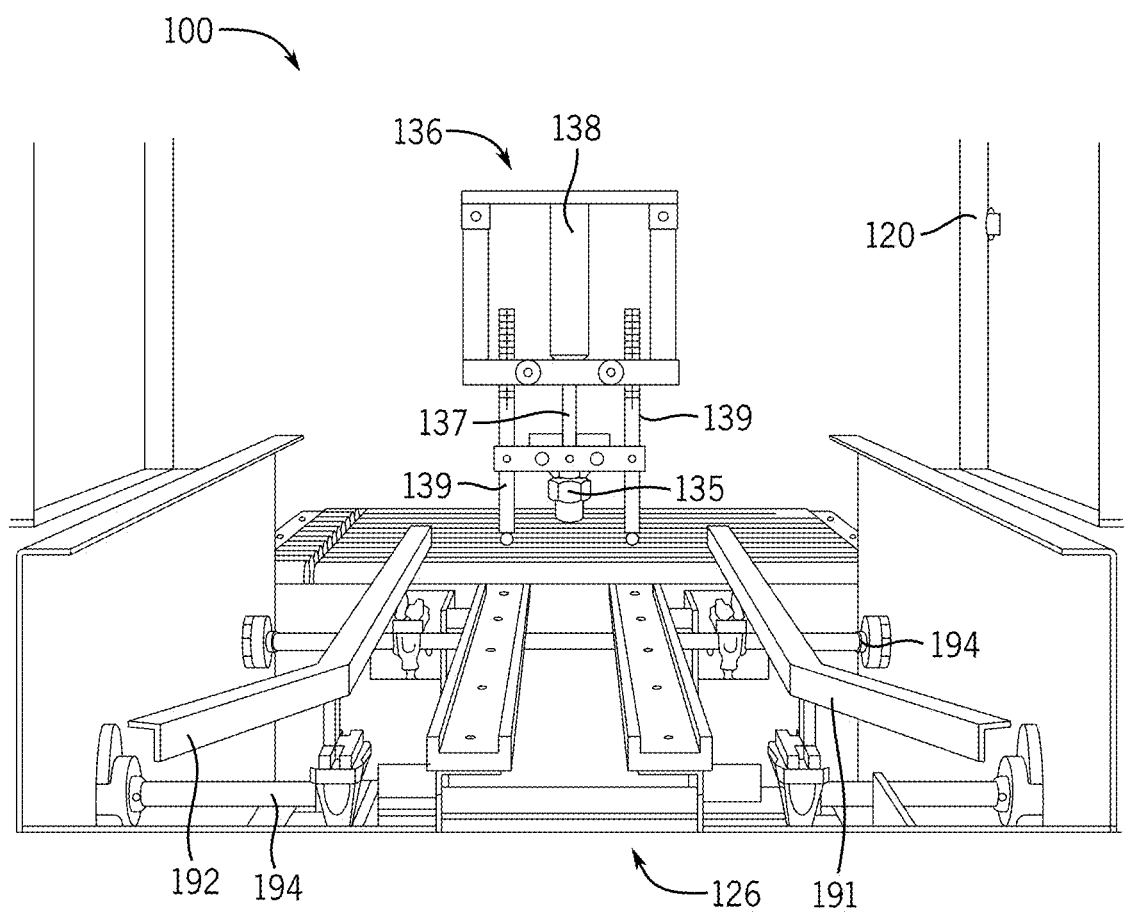
FIG. 1C is a partial right side view of the pan oiling system of FIG. 1A.

Turning to FIG. 1C, portions of the conveyor 125, nozzle 135, and guide mechanism 190 of the baking pan oiling device 110 are illustrated. Tracks 126 of the conveyor 125 may be configured to support a belt or table top chain conveyor for transporting the pans P through the baking pan oiling device 110. A nozzle height adjustment device 136 may include a coupling 137, 138 such as a threaded coupling configured to adjust a height of the nozzle 135 relative to the conveyor 125 to facilitate spraying oil onto pans having various shapes and sizes. Pan guides 139 may extend below the nozzle 135 may serve to guide pans P and protects the nozzle 135. A guide rail adjusting screw and bearing assembly 194 of the guide mechanism 190 may adjust the width of the guide rails 191, 192, and the guide mechanism 190 may include multiple assemblies 194, for instance one to adjust a distance between the rails 191, 192 and another to adjust a size of the widened region 193. The components of the conveyor 125, the nozzle 135 (e.g., the height adjustment device 136), and the guide mechanism 190 as well as other components of the baking pan oiling device 110 may be communicatively coupled to the control unit 145 to enable the variously shaped and sized pans P to be received in and guided through the housing 120 and for oil to be sprayed therein. For instance, the control unit 145 may adjust a height of the nozzle 136 by adjusting a position of the nozzle height adjustment device 136 so that the nozzle 135 is set above the top of the baking pans so as to direct spray from about 0.5 in. above the pan cavity.

Figure 2A:
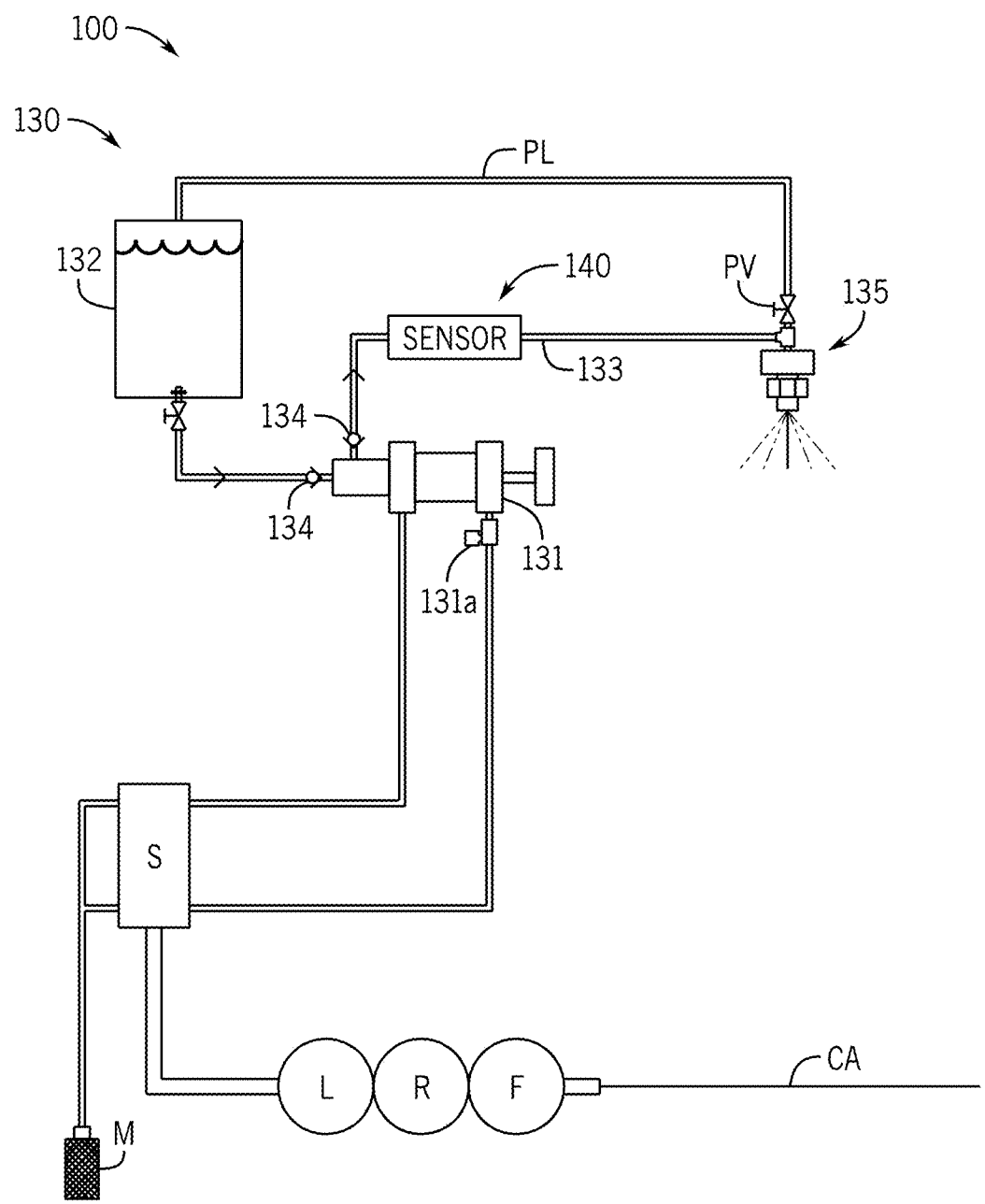
FIG. 2A is a flow diagram of oil and air flow through a pump of the oil supply of the pan oiling system of FIG. 1A, according to the present disclosure.

With reference to FIG. 2A, illustrated is a flow diagram of an exemplary piping arrangement of the oil supply 130 in which oil and air flow through a single pump of a single nozzle baking pan oiling system 100, according to the present disclosure. The oil supply 130 may be fluidly coupled to the nozzle 135 for delivery of oil during oil dispensing operations. A pump 131 of the oil supply 130 may draw-in oil from an oil reservoir 132 and deliver the oil to the nozzle 135 via an oil line 133. The oil supply 130 may pass through a strainer prior to entering the nozzle 135, such as at the egress of the oil reservoir 132. The oil metering pump 131 may be an air-driven pump including one or more solenoid valves S and air intake and exhaust ports, e.g., port A (lower) and port B (upper). The solenoid valve S may receive a supply of compressed air CA, e.g., at 50 psi, that has been filtered/regulated/lubricated and may exhaust to a muffler M. The pump 131 may isolate the oil from air by drawing the oil into a pump reservoir, which may be fluidly sealed from an air-driven piston of the pump 131. A cycle length of the pump 131 may determine the amount of oil dispensed through the nozzle 135, and a longer pump cycle may deliver more oil, while a shorter pump cycle may deliver less. An exemplary pump cycle may be about or at least about 10 ms, or any timeframe during which the shot of oil should be sprayed as provided in the present disclosure. The speed of the pump 131 may be adjusted by via the control unit 145 and/or manually via a speed control valve 131a.

In operation of the pump 131, check valves 134 (e.g., one-way valves) may prevent backflow of the oil. For instance, a first check valve 134 may be arranged between the pump 131 and the reservoir 132 and may prevent backflow of oil to the reservoir 132 as oil is drawn into the pump 131; and a second check valve 134 may be arranged between the pump 131 and the oil line 133 to prevent backflow of oil into the pump 131 as oil is transmitted out of the pump 131 through the oil line 133. The oil supply 130 may additionally be configured with a purge system in a purge valve PV and purge line PL leading back to the oil reservoir 132.

During an oil dispensing operation, the pump 131 may generate the fluid pressure necessary to cause to the nozzle 135 to operate. In some cases, an air cylinder of the pump 131 may generate greater fluid pressure than the air pressure supplied to the cylinder via an air supply, such as 1.25, 1.5, 1.75, 2.0, 2.25, 2.5, or 3.0 times greater. For instance, an air cylinder may have a 1.75 in. diameter piston and a 0.5 in. diameter rod. When delivering 50 psi of air pressure to the cylinder, fluid pressure output to the nozzle may be approximately 110 psi. However, in other implementations, the air pressure and fluid pressure may be substantially the same, such as within about 5 to about 20 psi of each other. Although the pump 131 is described as delivering oil without the introduction of air into the oil, the oil supply 130 may be configured to deliver a mixture of oil and pressurized air without departing from the other aspects of the present disclosure.

The oil reservoir 132 may be configured with a heater for heating the oil to elevated temperatures such as about 90 to about 212° F., or about 90 to about 150° F., or about 90 to about 110° F. The oil reservoir 132 may include a level sensor, and may be filled from either a drum pump or a bulk fill system. The oil reservoir 132 may require re-filling over time such as during a production run. Accordingly, a sensor of the oil reservoir 132 may be communicatively coupled to the control unit 145 and send signals indicative of an oil level within the reservoir. For instance, based on a low oil level determined by the control unit 145, the indicator 180 may be actuated to indicate the oil level is low in the reservoir 132 as provided herein.

The pump 131, oil reservoir 132 as well as other components of the oil supply 130 may be communicatively coupled to the control unit 145 to enable control of the oil supply 130 by the control unit 145. The amount of oil delivered per cycle of the pump 131 and temperature of the oil may be adjusted, for instance, based on the size of the pan to be oiled, the age of the pan, the type of comestible to be received, and so on, and the control unit 145 may be configured to adjust such parameters in a pan oiling operation. For instance, the pan may be re-used for many years if not damaged and the glazing remains viable. As the glazing wears-off, the amount of oil delivered to the pan may be increased oil. Commercial bakeries typically send pans out to be re-glazed after a predefined number of cycles, but this predefined number generally varies from bakery to bakery. Thus, the bread pan oil system 100 of the present disclosure may be used to account to variability in the level glaze remaining in a pan as it is used over extended periods of time.

The oil line 133 may extend between the pump 131 and the nozzle 135. In some implementations, the oil line 133 may be metal such as a stainless steel flex line, plastic (soft/hard), have a ⅛ in. to ⅜ in. diameter, and combinations. In some implementations, the sensor 140 may be coupled to the oil line 133. The control unit 145 may evaluate the signals from the oil delivery sensor 140 to determine whether the spray or shot of oil occurred or was missed, and for instance, sensor signals having a first signal type (e.g., strength) may be indicative of the oil line 133 transporting oil therethrough in connection with delivering a spray or shot of oil, and sensor signals having a second signal type (e.g., strength) different from the first signal type may be indicative of a lack of movement or slower than expected movement of oil through the oil line 133. In some examples, the control unit 145 may determine a timeframe at which the nozzle 135 should engage in a spraying operation, e.g., a timeframe during which the pump should activate and emit a spray or shot of oil and may evaluate the signals from the sensor 140 during the time window to determine whether the spray occurred or was missed.

Although the oil supply 130 of FIG. 2A is illustrated as including a single nozzle 135, providing baking pan oiling device 110 with multiple nozzles 135 is within the scope of the present disclosure. For instance, the sensor 140 may be positioned on a common oil line, e.g., trunk line, for sensing movement of oil through the oil supply 130. In addition or alternatively, a sensor 140 may be coupled to each of the multiple nozzles 135 or to a fluid line dedicated to a respective nozzle 135. Providing a sensor 140 on the common fluid line may enable the control unit 145 to detect a problem with the nozzles generally, or depending on the sensitivity of the sensor 140, may provide sensor data to the control unit 145 indicative of a problem with one or more of the multiple nozzles. Providing a sensor 140 for each nozzle 135 may enable the control unit 145 to identify problems for an individual nozzle 135 and may take action based thereon, such as disabling the components of the baking pan oiling device 110 associated with the problematic nozzle 135 while continuing to operate the other components associated with the working nozzles.

Figure 2B:
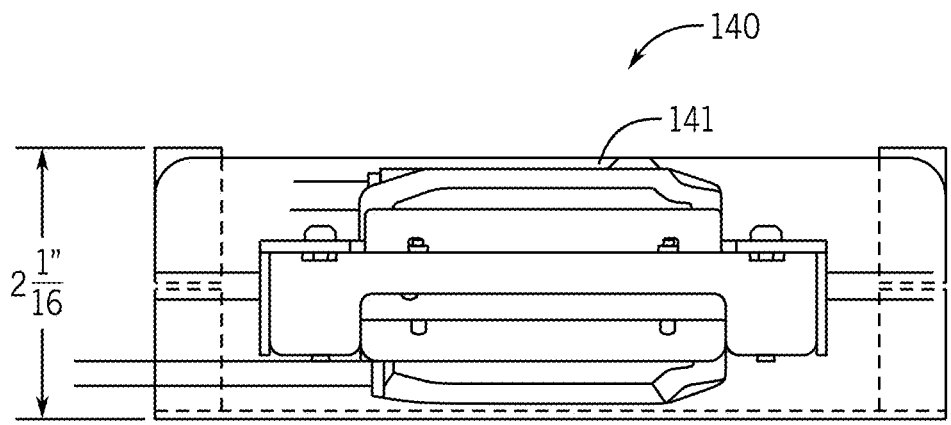
FIGS. 2B and 2C illustrate the sensor in combination with a sensor assembly of the pan oiling system of FIG. 1A, according to the present disclosure.
Figure 2C:
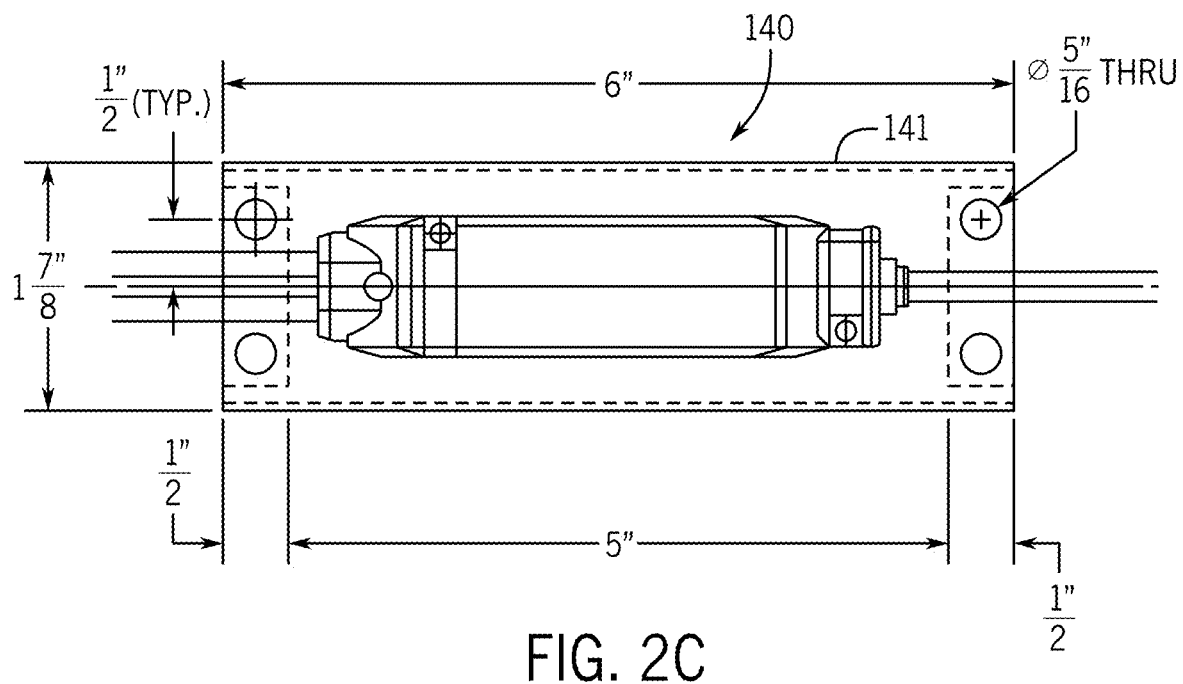

FIGS. 2B and 2C illustrate the sensor 140 in combination with a sensor assembly 141 of the pan oiling system, according to the present disclosure. The sensor assembly 141 may be configured as a clamp for coupling the sensor 140 onto the oil supply 130, such as the oil line 133. In some implementations, the sensor assembly 141 may be configured to join to the oil line 133 proximate the pump 131 such as within the housing 120 of the baking pan oiling device 110. Alternatively, the sensor assembly 141 may be configured to join to the oil line 133 proximate the nozzle 135, such as external to the housing 120, or may be configured to join to the nozzle 135.

Figure 3:
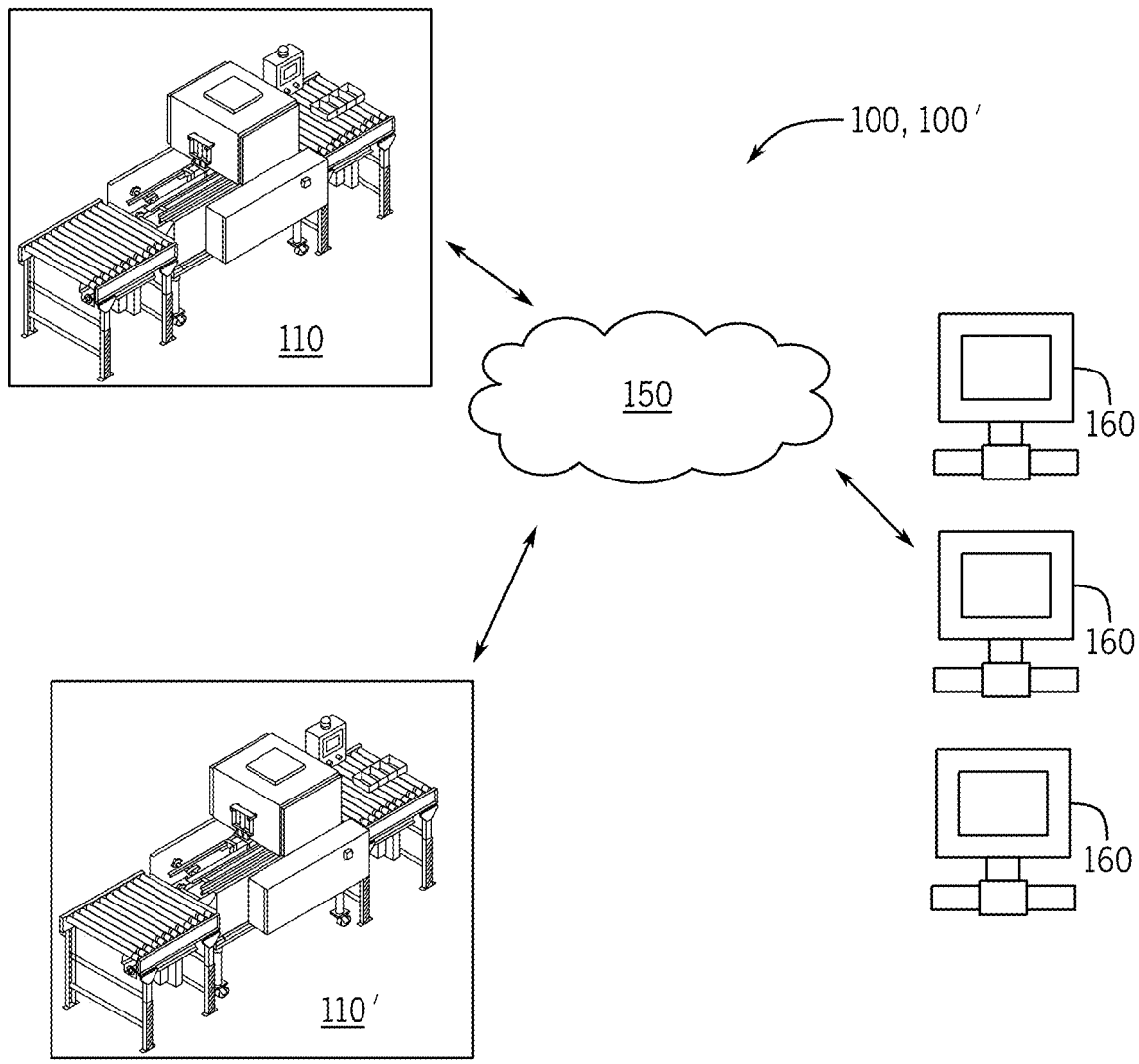
FIG. 3 illustrates a plurality of baking pan oiling systems implemented over a common network, according to the present disclosure.

FIG. 3 illustrates a plurality of baking pan oiling systems 100, 100' implemented over a common network 150, according to the present disclosure. Each of the baking pan oiling systems 100, 100' may include the components described herein and may be communicatively coupled to the remote user devices 160 via the network 150.

According to implementations of use, the control unit 145 may configure the pan oiling device 110 according to the parameters received for an oiling operation, e.g., according to a selection of pan type or a selection of an oiling program by a user input. The selections may be via the user interface 170, via the remote user devices 160, or other communicatively coupled components of the system 100. Depending on a type of pan P to be oiled or on a type of oiling operation selected, the control unit 145 may implement a pre-programmed pan oiling operation that causes the baking pan oiling device 110 to prepare for receipt of the pans and to operate so that the oil is deposited onto the pans. The control unit 145 may automatically adjust the components of the baking pan oiling device 110 to cause a pre-defined amount oil to be deposited into the target pans by the nozzle, to cause a height of the nozzle 135 relative to a surface of the conveyor 125 to be adjusted (e.g., 0.5 in. above a pan) using the nozzle height adjustment device 136, and/or to cause the guide mechanism 190 to adjust a width of the guide rails 191, 192 to correspond to a width of the pans P to be oiled. In addition, one or more of the conveyors may operate at a pre-determined speed or conveyor rate, the pump 131 may be programmed to operate to dispense oil after a pre-determined timeframe from which the pan P is sensed by the pan sensor 185 such as according to a shot centering delay time, which may be a delay from the time of the pan sensor 185 sensing a pan P to allow the pan to be centered under the nozzle 135. The control unit 145 may proceed with the pan oiling operation for a pre-determined time or for a pre-determined number of pans P pass through the device 110.

As the pans P are transported by the conveyors 105, 115, 125 during this operation, the spray sensor 140 senses whether or not oil is delivered to the pans P by the oil supply 130, e.g., whether or not oil exits the nozzle 135 onto the pans P. The sensor 140 transmits the sensor signals to the control unit 145. Based on the sensor information, the control unit 145 may determine the nozzle 135 is not functioning or not functioning properly. For instance, based on receiving sensor data indicating the nozzle 135 failed to spray over a spraying operation (e.g., spraying shot or dose), or over a pre-determined number of spraying operations, the control unit 145 may determine the baking pan oiling device 110 is non-operational, which may indicate the nozzle 135 or the oil supply 130 is blocked, for example. In another example, the device 110 may be non-operational after the pump 131 operates a predetermined number of times with no oil flow detected based on the signals from the sensor 140, the control unit 145. Due to the absence of movement of the oil or of spraying operation(s), the control unit 145 may then take action, for instance to prevent damage to the pans P, and may cause the baking pan oiling device 110 to cease the spraying operating such as by ceasing operation of the conveyor 125 and/or of the pump 131. The control unit 145 may additionally cause a message to be transmitted over the network of 100 to alert users of the network that the device 110 is non-operational and action is required. In addition, the control unit may cause the indicator 180 to be actuated. In some cases, the control unit 145 may determine a timeframe at which the nozzle 135 should engage in a spraying operation, e.g., a timeframe during which the pump should activate and emit a spray or shot of oil, and the control unit 145 may evaluate the signals from the sensor 140 to determine whether the oil flow/spray is present or absent. Various aspects of the implementations of use may be implemented in the pan oiling operation described in connection with FIG. 4.

Figure 4:
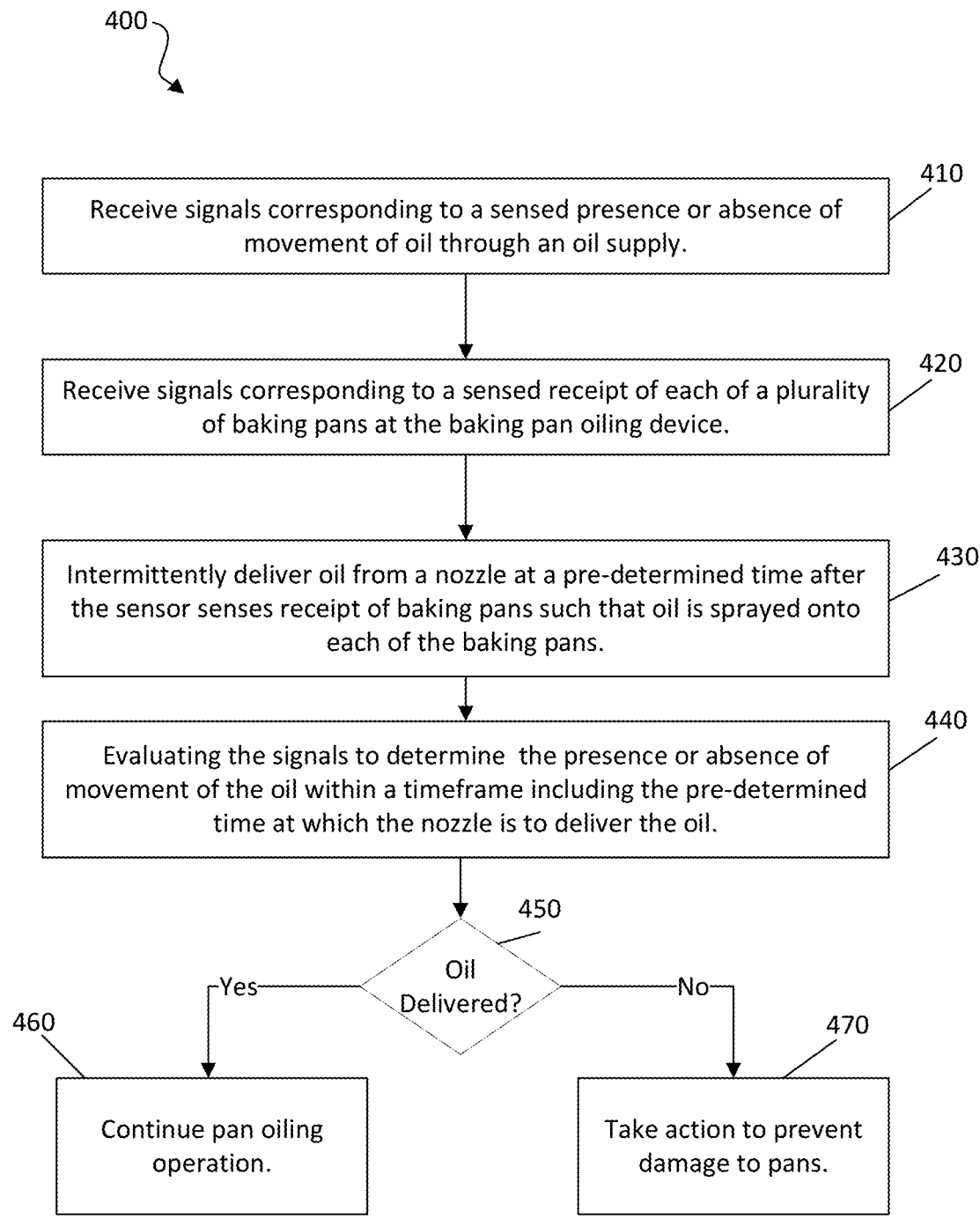
FIG. 4 illustrates a method for implementing a pan oiling operation using the baking pan oiling system, according to the present disclosure.

With reference to FIG. 4, illustrated is a method 400 for implementing a pan oiling operation using the baking pan oiling system 100 of the present disclosure. The method 400 may proceed in operation 410 by receiving signals generated by the pan oiling sensor 140 during the pan oiling operation corresponding to a sensed presence or absence of movement of oil through an oil supply. In operation 420, signals generated by the pan sensor 185 may be received that correspond to a sensed receipt of each of a plurality of baking pans at the baking pan oiling device. In operation 430, the nozzle 135 may intermittently deliver oil therefrom at a pre-determined time after the sensor senses receipt of the baking pans such that oil is sprayed onto each of the baking pans. In operation 440, the sensor signals may be evaluated to determine the presence or absence of movement of the oil within a timeframe including the pre-determined time at which the nozzle is to deliver the oil. In operation 450, and based on the evaluation, a determination is made about whether oil was delivered. If so, the method 400 proceeds to operation 460 in which the pan oiling operation continues, e.g., until all baking pans in the run are oiled or until a pre-defined pan oiling operation time such as 15 minutes, elapses. If not, the method 400 proceeds to operation 470 in which the action is taken by the system 100 to prevent damage to the pans as provided herein.

It will be appreciated that the control unit 145 may be used to detect the presence or absence of oil flow/spray using a variety of approaches using a variety of sensors disclosed herein. Accordingly, the various sensors disclosed herein may include but are not limited to: ultrasonic sensors, pressure sensors, photoelectric sensors, proximity sensors, acoustic sensors, moisture sensors, mechanical sensors, and so on. Moreover, the control unit 145 may communicate with these sensors to determine various operations of the system 100 including the pans P as provided herein.

Various functionalities described herein may be accomplished with the use of a computer, including the controller or microprocessor and non-transitory computer readable medium or memory, with instructions stored thereon to be executed by the controller or processor. For instance, a computer-readable storage medium with an executable program stored thereon may instruct the controller or processor to perform the functions provided herein.

Various changes may be made in the form, construction and arrangement of the components of the present disclosure without departing from the disclosed subject matter or without sacrificing all of its material advantages. The form described is merely explanatory, and it is the intention of the following claims to encompass and include such changes. Moreover, while the present disclosure has been described with reference to various embodiments, it will be understood that these embodiments are illustrative and that the scope of the disclosure is not limited to them. Many variations, modifications, additions, and improvements are possible. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A baking pan oiling device, comprising:
   a housing, the housing comprising a conveyor mechanism and an oil supply, the conveyor mechanism for conveying a plurality of baking pans through an interior of the housing during a pan oiling operation of the plurality of baking pans;
   a nozzle fluidly coupled to the oil supply, the nozzle comprising a nozzle opening directed towards the conveyor mechanism, wherein the oil supply is configured to deliver oil to the nozzle intermittently during the pan oiling operation such that the nozzle intermittently sprays the oil onto the each of the plurality of baking pans;
   a first sensor configured to generate signals corresponding to a sensed presence of movement of oil through the oil supply and to generate signals corresponding to a sensed absence of movement of oil through the oil supply during the pan oiling operation; and a control unit communicatively coupled to the first sensor, wherein the control unit is configured to receive the sensor signals corresponding to the sensed presence of the movement of oil or the sensed absence of the movement of oil during the pan oiling operation, wherein upon receiving the sensor signals corresponding to the sensed absence of the movement of oil during the pan operation, the control unit is configured to cease the pan oiling operation.

2. The baking pan oiling device of claim 1, wherein the control unit is communicatively coupled over a network and configured to transmit a message to at least one remote user device upon the control unit ceasing the pan oiling operation.

3. The baking pan oiling device of claim 1, wherein the baking pan oiling device comprises an indicator, and wherein the control unit causes the indicator to be actuated upon ceasing the pan oiling operation.

4. The baking pan oiling device of claim 1, wherein the oil supply comprises a pump.

5. The baking pan oiling device of claim 4, wherein the pump is coupled to a reservoir of the oil supply and is operable to transmit oil through an oil line to the nozzle.

6. The baking pan oiling device of claim 5, wherein the first sensor is arranged between the pump and the nozzle.

7. The baking pan oiling device of claim 6, wherein the first sensor is coupled to the oil line.

8. The baking pan oiling device of claim 1, further comprising a second sensor configured to sense when one of the plurality of baking pans is received at the baking pan oiling device, and wherein the oil supply delivers the oil to the nozzle at a pre-determined time after the second sensor senses when the one of the plurality of baking pans is received.

9. The baking pan oiling device of claim 1, wherein the nozzle is height adjustable.

10. The baking pan oiling device of claim 1, further comprising guide rails extending parallel along a direction of transport of the conveyor, the guide rails configured to guide the plurality of baking pans through the housing.

11. The baking pan oiling device of claim 1, wherein the first sensor is configured to sense a change in pressure in the oil supply, wherein the change in pressure in the oil supply corresponds to an intermittent spray operation of the nozzle and an absence of the change in pressure in the oil supply corresponds to a missed spray operation of the nozzle, and wherein the absence of the movement of oil during the pan oiling operation is determined by the control unit upon receiving a predetermined number of absences of the change in pressure in the oil supply.

12. The baking pan oiling device of claim 1, wherein the first sensor is a spray sensor and is configured to sense a presence of the spray at the nozzle and an absence of the spray at the nozzle, and wherein the absence of the movement of oil during the pan oiling operation is determined by the control unit upon receiving a predetermined number of absences of the spray at the nozzle.

13. A baking pan oiling device, comprising:
a first sensor configured to generate signals corresponding to a sensed presence of movement of oil through an oil supply and to generate signals corresponding to a sensed absence of movement of oil through the oil supply during a pan oiling operation;
a second sensor configured to sense a receipt of one of a plurality of baking pans at the baking pan oiling device;
a nozzle fluidly coupled to the oil supply, the nozzle comprising a nozzle opening for spraying oil onto each of the plurality of baking pans, wherein the oil supply is configured to deliver oil to the nozzle intermittently during the pan oiling operation such that the nozzle intermittently sprays the oil onto each of the plurality of baking pans;
a control unit communicatively coupled to the first sensor and to the second sensor, wherein the control unit is configured to receive the sensor signals from the first sensor corresponding to the sensed presence of the movement of oil or the sensed absence of the movement of oil during the pan oiling operation and from the second sensor corresponding to the receipt of the one of the plurality of baking pans,
wherein the control unit is configured to cause the oil supply to deliver the oil to the nozzle at a predetermined time after the second sensor senses when the one of the plurality of baking pans is received during the pan oiling operation,
wherein upon receiving the sensor signals from the first sensor within a timeframe including the predetermined time, the control unit is configured to determine the presence of the movement of oil or the absence of the movement of oil during the pan oiling operation, and upon determining the absence of the movement of oil during the pan oiling operation, the control unit is configured to cause the nozzle to cease spraying.

14. The baking pan oiling device of claim 13, wherein upon determining the absence of the movement of oil during the pan oiling operation, the control unit causes the pan oiling operation to stop.

15. The baking pan oiling device of claim 13, wherein the control unit is communicatively coupled over a network, and upon determining the absence of the movement of oil during the pan oiling operation the control unit is configured to transmit a message to at least one remote user device.

16. The baking pan oiling device of claim 13, wherein the baking pan oiling device comprises an indicator, and wherein upon determining the absence of the movement of oil during the pan oiling operation, the control unit causes the indicator to be actuated.

17. The baking pan oiling device of claim 13, wherein the oil supply comprises a pump, and wherein the pump is coupled to a reservoir of the oil supply and is operable to transmit oil through an oil line to the nozzle.

18. The baking pan oiling device of claim 17, wherein the first sensor is coupled to the oil line.

19. The baking pan oiling device of claim 17, wherein the first sensor is coupled to the nozzle.

* * * * *